Sept. 15, 1953
R. K. SIMMS
2,652,344
CARBON BLACK PELLETING
Filed April 1, 1949
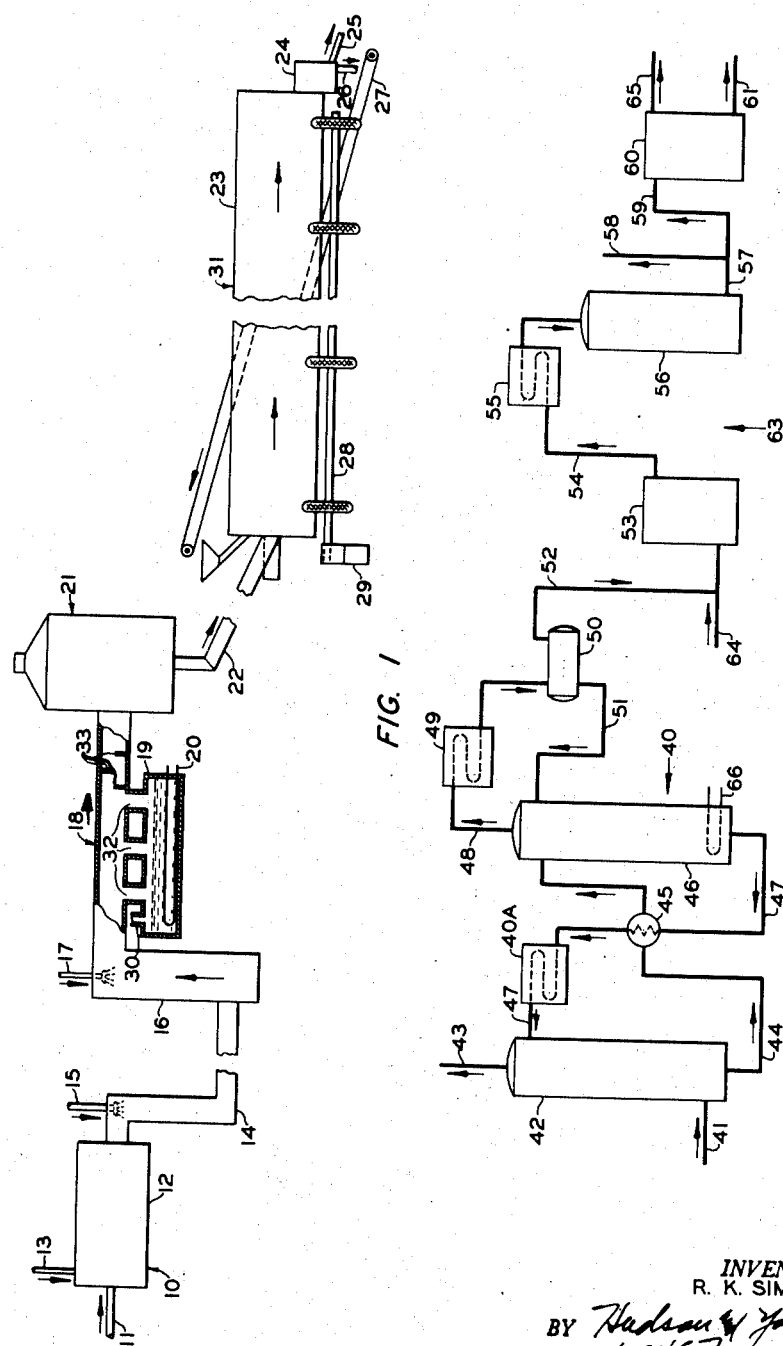
INVENTOR.
R. K. SIMMS
BY
ATTORNEYS Patented Sept. 15, 1953

2,652,344

UNITED STATES PATENT OFFICE 2,652,344

CARBON BLACK PELLETING

Russell K. Simms, Bartlesville, Okla., assignor to Phillips Petroleum Company, a corporation of Delaware Application April 1, 1949, Serial No. 84,926

4 Claims. (Cl. 106—307)

This invention relates to the production of an improved carbon black pellet product. In one of its more specific aspects it relates to a method for the production of an improved carbon black pelleted product.

One object of my invention is to provide a method for the production of improved carbon black pellets made from furnace type carbon black. Another object of my invention is to produce a new type carbon black pellet suitable for use in rubber manufacture. Still another object of my invention is to provide a carbon black pellet product which when compounded with crude natural rubber or with synthetic rubber stocks and the compound vulcanized, an improved rubber product results. Still another object of my invention is to provide a carbon black pelleted product which when compounded with rubber stocks will impart to the rubber compound or mix improved resistance to scorching. Yet another object of my invention is to provide a valuable market outlet for hydrogen sulfide sulfur, which normally is disposed of as a waste product. Still other objects and advantages of my invention will be obvious to those skilled in the art upon reading the following specification and drawing, which respectively describes and illustrates a preferred embodiment of my invention.

Carbon black is currently produced in substantial quantities by numerous furnace processes. In these processes a liquid or gaseous hydrocarbon feed stock is fed into a furnace along with a quantity of air. Only sufficient air is added to burn a portion of the hydrocarbon for the production of the necessary heat to decompose the unburned hydrocarbon to carbon black. The effluent or smoke stream from such a furnace comprises light gases such as hydrogen, water vapor, carbon dioxide and carbon monoxide, and solid particles of carbon. This smoke stream is cooled from a furnace temperature of between 2000° F. to 3000° F. to a temperature of 200° F. to 600° F. by one or more cooling steps. The cooled smoke stream then passes to some means such as a Cottrell precipitator for the recovery of the carbon black.

The carbon black recovered from the precipitation step may be compressed to increase its weight per unit of volume and packaged or it may be converted into pellets for bulk shipment. Carbon black pellets are ordinarily quite dense as compared to the carbon black as produced. The advantages for pelleting carbon black are numerous, several of which are, reduction of a dust hazard during handling, elimination of packaging and compressing costs, and reduction of shipping costs.

I now propose to produce a carbon black with improved precipitation and pelleting properties. To produce this improved carbon black, I inject a stream of vaporous sulfur into the above mentioned smoke stream prior to recovery of the carbon black by precipitation. It is known that sulfur in the solid state exhibits an appreciable vapor pressure, for example about 0.0085 mm. of mercury at 100° C., and about 0.0285 mm. of mercury at 114.5° C. Accordingly, if all or a part of the carbon black-containing stream from the production furnace is passed in contact with a bed of hot sulfur, a quantity of sulfur is sublimed into the smoke stream. The carbon black particles will function as nuclei on which the sulfur vapor may deposit in more or less molecular form, or at least in a colloidal form. By the term "colloidal form," I mean particles of very small size, that is, of the order of about a maximum of 1 micron. Colloidal sulfur is electronegative and carbon black is likewise electronegative. Colloidal sulfur will nevertheless be deposited on the carbon black particles in a manner similar to the deposition of colloidal sulfur on glass which is also electronegative.

The quantity of sulfur sublimed into the carbon black containing smoke may vary over a considerable range depending upon the particular utilization of the finished carbon black pellets. In operation this proportion of sulfur may be varied by merely increasing or decreasing the temperature of the sulfur over which the carbon black is passed. Another method of controlling the proportion of sulfur added to the carbon black is to pass only a controlled portion of the carbon black-containing stream over the hot sulfur. When carbon black is to be used in the compounding of rubber, the quantity of colloidal sulfur contained in the finished carbon black may be about 4 per cent by weight. However, the amount of sulfur added will depend upon the intended use of the product. For most uses carbon black may contain from about .05 per cent to 10 per cent by weight, but usually about 1 per cent to 5 per cent by weight. These limits however may be exceeded when the occasion requires the use of a carbon black containing less sulfur than the above mentioned lower limit or more sulfur than the above mentioned upper limit.

The presence of the electronegative colloidal sulfur will in most cases improve the precipitation efficiency of an electroprecipitator. Furthermore, the dry process pelleting of the flocculent carbon black will be improved by the presence of the colloidal sulfur.

It should be pointed out that my process yields a new and useful product, namely, a carbon black pellet containing colloidal sulfur in amounts sufficient for use in the manufacture of rubber, or for any other use requiring a mixture of carbon black and sulfur. Depending upon the percentage of the colloidal sulfur present, the pH of the carbon black product is reduced accordingly. This effect may be due in part to the presence of small quantities of polythionic acid. In any event my new carbon black pellet may be a satisfactory replacement for present acid treated carbon black now produced by some manufacturers.

According to my invention the sulfur added to carbon black may be obtained from most any source, for example, brimstone sulfur, flowers of sulfur, or sulfur produced by chemical process. It is merely necessary to add the sulfur in a very finely divided or colloidal form to the carbon black. As mentioned hereinbefore, sulfur vapors may be produced by heating solid sulfur to the necessary temperature and carbon black passed in contact with these vapors. The sulfur may be produced by chemical means, such as by the oxidation of hydrogen sulfide to sulfur with the addition of the hot stream of vaporous sulfur directly into the carbon black stream prior to electroprecipitation, or the chemically produced sulfur may be condensed and added to the carbon black as would any solid sulfur.

In the drawing, Figure 1 represents diagrammatically one form of apparatus in which to carry out a complete and preferred process of my invention. Figure 2 represents diagrammatically a form of apparatus in which sulfur may be produced chemically from hydrogen sulfide and subsequently added to the carbon black.

Referring now to the drawing and specifically to Figure 1, the carbon black producing furnace is identified by reference numeral 12, the sulfur-carbon black mixing apparatus by reference numeral 18. Numeral 21 refers to an electro precipitation apparatus while the carbon black pelleting apparatus is referred to by reference numeral 31.

The carbon black producing apparatus referred to by reference numeral 10 as the carbon black producing apparatus may be any useful furnace apparatus in which a hydrocarbon gas or a vaporized oil, or a mixture of the two is used as the feed stock. For example, the apparatus described in U. S. Patents 2,375,795, 2,375,796 and Re. 22,886, and in a copending application of Joseph C. Krejci, Serial No. 743,893, filed April 25, 1947, now Patent No. 2,564,700, may be used. I prefer to operate the apparatus 10 according to the methods described in these patents and application.

In one form of the apparatus 19, the furnace 12 may contain a refractory lining suitable for exposure to high temperatures. The interior of the reaction space of the furnace 12 may be cylindrical in shape and elongated. Into one end of this furnace is provided the tube 11 through which hydrocarbon charge stock is passed into the furnace. A tube 13 extends through the side wall of the furnace in such a manner that the longitudinal axis of the tube is tangential to the inner cylindrical wall and perpendicular to the longitudinal axis of the furnace 12. To the other end of the furnace is attached the pipe 14 for conveyance of the furnace effluent. Into the pipe 14 at the position indicated extends a pipe 15 which is intended to represent a water spray. The pipe 14 may further serve as a heat exchanger in which hot furnace effluent is in indirect heat exchange with the atmosphere. Apparatus part 16 is a secondary water quench apparatus into which extends the pipe 17 through which water may be conducted for this quenching operation. The upper portion of the sulfur addition apparatus 18 is merely a pipe for conducting the cooled carbon black-containing gases from the quencher 16 to the electroprecipitator 21. Openings 32 are provided in the bottom of this conduit through which sulfur vapors may pass into the carbon containing stream. A sulfur pot 19 is provided for containing the sulfur. Inlet 30 is provided as a means through which solid or liquid sulfur may be added to the sulfur pot 19. A coil 20 is provided in the lower portion of this sulfur pot 19 through which steam may be passed for heating and/or melting the sulfur in case solid sulfur is added and for maintaining the sulfur at the proper temperature.

As mentioned hereinbefore, reference numeral 21 refers to an electro precipitator of the Cottrell or any other suitable type. In case cyclone separators need be used in conjunction with the electroprecipitator, reference numeral 21 is intended to include all the required means of separation. From this separation apparatus, a conduit 22 leads to the pelleting apparatus 31. A pelleting apparatus comprising a mill particularly adapted for carrying out this pelleting step and its operation are described in a copending application by M. L. Studebaker, Serial No. 19,983, filed April 9, 1948.

This pelleting apparatus consists of an elongated, cylindrical drum 23 which may be mounted on, for purposes of support and rotation, a wheel assembly 28. Such a rotation means as this wheel assembly may be composed of two shafts upon which are mounted rubber tired wheels, one of the shafts being positoned on either side of the drum to serve as a support. At least one of the shafts is rotated by a source of power 29. By providing a proper gear reduction in conjunction with the source of power 29 or by providing a variable speed electric motor, for example, the drum 23 may be rotated at any desired speed.

A divider box 24 is provided at the discharge end of the pelleting drum and is constructed in such a manner that the pelleted carbon black discharged from the drum may be divided into two portions. One of these portions is passed through conduit 25 to storage, shipment, or other disposal as desired, and not shown on the drawing. The remaining portion of the pellets is passed through conduit 26 and drops onto a conveyor 27. This conveyor 27 may be any type of conveyor desired but it is preferred that the conveyor be an endless belt type conveyor. The conveyor transports the pellets as received from conduit 26 and discharges them into a hopper from which they pass through a tube into the inlet end of the drum 23.

In the operation of the furnace 12 of this apparatus, a hydrocarbon gas or a hydrocarbon oil in the vapor state is injected axially into the furnace through the inlet pipe 11. The charge stock may be preheated in a conventional preheating apparatus, not shown, prior to passage into the furnace. A stream of air or a combustible mixture of a fuel gas and air is injected into the furnace through the tangentially disposed tube 13. This stream of air or combustible mixture is injected through tube 13 at a sufficiently great velocity that the combustible mixture and products of combustion adhere to the walls of the furnace as a helically rotating annulus. It is intended that the feed stock injected through line 11 travel as a core along the axis of the furnace. This core of carbon forming material is accordingly separated from the cylindrical walls of the furnace by the helically moving annulus of gases. When the tangentially added fuel-air mixture contains just enough air for complete combustion of the fuel, mixing of the helically moving hot combustion gases and the axially added hydrocarbon occurs with the transfer of sufficient heat to decompose the hydrocarbon. When an excess of air or oxygen is used in the tangential fuel mixture or when air or oxygen alone are added tangentially the axially added hydrocarbon serves as both reactant hydrocarbon and fuel. The effluent from the furnace passes into line 14 and is quenched by a spray of water from pipe 15. The conduit 14 may be a long section of pipe adapted to cool further the quenched effluent by heat exchange with the atmosphere or the conduit 14 may be a relatively short section of pipe. The furnace effluent from pipe 14 may be further quenched in chamber 16 by water sprayed from pipe 17. Of course, when the entire cooling is by water spray, more water is required than when a portion of the cooling is by heat exchange with the atmosphere. In any event, whatever final cooling is required is carried out by the water spray 17.

The cooled furnace gases and carbon black pass from this quench chamber 16 through conduit 18. A quantity of sulfur is placed in the sulfur pot 19 and heated by passage of steam through coil 20. Sulfur vapors produced from this sulfur may pass through the openings 32 into the stream of carbon black, or a portion of the stream of carbon black from conduit 18 may be passed through one or more of the openings 32 into the vapor space above the body of sulfur. Some baffles 33 may be provided in conduit 18, as illustrated, to assure thorough mixing of the sulfur vapors with the carbon black containing gases so that by the time the carbon black containing gases enter the electroprecipitator 21, their composition will be uniform. As mentioned hereinbefore this precipitator 21 may be an electroprecipitator of any standard type supplemented by cyclone or other separators as required.

From the separation apparatus 21, the still warm sulfur-containing carbon black may be passed through a conduit 22 directly into the pelleting apparatus 31 or the carbon black-sulfur mixture may be passed to a storage means, not shown, prior to the passage to the pelleting apparatus.

The carbon black charged through conduit 22 into the pelleting apparatus 31 is preferably maintained at a temperature above 175° F. This temperature may be maintained by circulation of hot gases from an extraneous source, not shown, through the drum 23, or the temperature may be maintained by merely making provision that the carbon black-sulfur feed stock to the drum be at a sufficiently high temperature that the temperature within the drum is maintained at 175° F. or at such higher temperature, as desired, during the pelleting operation. However, temperature should not be maintained so high as to melt the sulfur or otherwise destroy its fine or colloidal state of subdivision.

The pelleting drum 23 may be a hollow cylindrical steel shell so disposed upon the wheel assembly 28 that the drum may be rotated, as mentioned hereinbefore. If desired, provision may be made to maintain the walls of the drum free from adhering carbon black by utilization of a scraper assembly. Or, if desired, a hammer assembly may be installed outside of the drum with a number of hammers positioned at spaced intervals along the length of the drum. The hammers may be operated by a cam means in such a manner that all hammers may hit the drum at one time or so that only one hammer will hit the drum at a time. This latter method is preferable.

The conduit 22 is intended to discharge its charge of flocculent carbon black and sulfur into one end of a horizontally disposed conveyor means positioned axially throughout at least a portion of the length of the drum 23. This conveyor means may preferably be a screw conveyor, and the tube in which is disposed the rotating screw is provided with openings positioned at intervals along its bottom. These openings are so positioned that the mixture of flocculent carbon black and sulfur may be added to the carbon black pellets in the rotating drum at desired points. It is preferred that the first addition of flocculent carbon black and sulfur be added to the pelleting drum at a distance of from 2 to 4 feet inside the drum so that the quantity of pellets recycled by conveyor 27 will be in a state of equilibrium when the first portion of the flocculent carbon black-containing sulfur is added. The several points of addition of flocculent carbon black may be 6 to 8 feet apart in a 6 feet diameter by 48 feet long mill so that following each addition of black-containing sulfur, the pellets will acquire a surface coating of flocculent material and be rolled and hardened and ready for another coating. This procedure may be repeated several times as, for example, from 3 to 5 points of addition of flocculent black-containing sulfur may be provided for. In a pelleting drum which is 6 feet in diameter and 48 feet long, the last 15 to 18 feet of the drum should not receive any flocculent material but should be maintained merely as a hardening and polishing zone. Such a pellet mill should preferably be rotated at a speed of from 5 to 12½ R. P. M. when producing about 1000–2000 pounds of pellets per hour. A recycle ratio of ½:1 to 2:1 of recycle pellets to raw feed may be employed when producing 2000 pounds of pellets per hour. In the hereinbefore mentioned application for patent, Serial No. 19,983, is disclosed a method for the hardening of pellets which consists in tumbling pellets in a cylindrical mill rotating at a speed greater than is permissible in actual pellet formation. In a hardening mill of 6 feet diameter and 48 feet long into which 2000 pounds of pellets per hour are charged the hardening mill speed may be varied from 13½ to 16 R. P. M.

The apparatus of Figure 2 is intended for use in the extraction and recovery of hydrogen sulfide from such hydrocarbon materials as sour natural gas, low boiling liquid mixtures, or vapors from cracking operations. The portion of this apparatus referred to by reference numeral 49 is the apparatus portion specifically for use in the extraction and recovery of the hydrogen sulfide from the above mentioned types of feed stocks. The second portion of this apparatus identified by reference numeral 63 is for the transformation of the sulfur of the hydrogen sulfide to elementary sulfur.

The apparatus portion 40 may consist of an absorber-stripper apparatus and auxiliary parts. In the absorber the hydrogen sulfide containing hydrocarbons may be contacted with an amine solution which selectively extracts the hydrogen sulfide from the hydrocarbon. In a separate stripper vessel, the amine solution upon heating gives up its absorbed hydrogen sulfide in the form of relatively pure product.

The construction and operation of such hydrogen sulfide extracting apparatus is well known in the art and I will explain its operation only briefly. The hydrogen sulfide containing hydrocarbon is passed through a line 41 into the bottom portion of a contacting vessel 42. This vessel may be equipped with bubble cap trays or other packing material adapted for promoting efficient contacting between an upwardly flowing hydrocarbon fluid and a downwardly flowing amine solution. From line 47 is passed into the top of this contacting vessel 42 an amine solution. This amine solution may be a solution of an aliphatic amine such as monoethanol amine, diethanol amine or triethanol amine. When monoethanol amine is the absorbent used, it may be used in the form of an aqueous solution containing from 15 to 20 per cent of the amine. Less concentrated or more concentrated amine solutions may be used, if desired, and as circumstances warrant. Contacting of the hydrogen sulfide containing fluid with the amine solution in vessel 42 may be carried out at atmospheric temperature. From the top of the contactor 42, hydrogen sulfide free hydrocarbons leave the vessel through the overhead line 43 to such disposal as desired. The hydrogen sulfide containing amine solution leaves this vessel through the rich absorbent line 44 and is heated in exchanger 45 prior to passage into the still or stripper vessel 46. Vessel 46 may be equipped with bubble cap contacting apparatus or other packing material as desired. A heating element 66, preferably a closed type steam coil, may be provided in the bottom of the stripper 46 to furnish such heat as found necessary to strip completely the hydrogen sulfide from the amine solution. For efficient recovery of hydrogen sulfide from a solution containing 15 to 20 per cent monoethanol amine, sufficient heat should be furnished from element 66 that the aqueous solution in the bottom of the vessel 46 is maintained at its boiling temperature. Lean absorbent solution is then removed from the stripper 46 through line 47 and passed through the heat exchanger 45 for cooling prior to reintroduction into the absorbent vessel 42. Usually an additional cooler 40A is provided to complete the cooling operation so that the amine solution may be in a condition for maximum absorption of hydrogen sulfide. The hydrogen sulfide leaves the top of the stripper 46 through an overhead line 48 and is cooled by cooler or condenser 49. This condenser 49 is operated at a sufficiently low temperature that a large portion of the water vapor and entrained amine solution in the overhead stream is condensed into condensate containing water, some amine and some hydrogen sulfide in solution, and this condensate and the uncondensed hydrogen sulfide gas are passed into the receiver or accumulator 50. A line 51 connects to bottom of the receiver 50 with the top of the stripper vessel 46 for return of condensate to reflux the top of the stripper. The hydrogen sulfide is removed from the top of vessel 50 and is passed through a line 52 into the apparatus identified by reference numeral 63, which apparatus is for the conversion of the hydrogen sulfide to elementary sulfur.

The hydrogen sulfide-containing gas passing through line 52 may usually contain from 50 per cent to 95 per cent of hydrogen sulfide. The remaining portion may consist of water vapor, carbon dioxide, and some hydrocarbons. A controlled amount of air from a line 64 is added to this stream of gas flowing through line 52 and the mixture is passed into a burner apparatus in chamber 53. Sufficient air is mixed with the hydrogen sulfide containing gas to burn all the hydrocarbon content and a portion of the hydrogen sulfide. While the air added through line 64 is intended to consume the hydrocarbon content of the gas, it is also necessary to provide sufficient air for the production of sufficient sulfur dioxide so that the gases leaving the combustion chamber 53 contain hydrogen sulfide and sulfur dioxide in proper ratio for conversion of all of the sulfur to elementary sulfur. The reaction of hydrogen sulfide and sulfur dioxide to elementary sulfur may be illustrated by the following equation: $2H_2S + SO_2 = 3S + 2H_2O$. Since the partial oxidation of the vapor stream in combustion chamber 53 raises the temperature of the gases within this chamber to a level in the range of 2000 to 2500° F., it is necessary to cool these gases to a temperature of in the range of 400 to 600° F. prior to their introduction into the catalyst vessel 56. Transfer line 54 is accordingly provided with a heat exchanger or cooler 55 which is adapted to carry out this cooling operation as mentioned above. The cooled gaseous products from chamber 53 are then introduced into the top of the catalyst vessel 56. In this vessel is provided a bed of catalytic material such as bauxite. This bauxite is maintained at a temperature between about 400° F. and 600° F. and at this temperature bauxite is active for the promotion of the above given chemical reaction, that is, the reaction of hydrogen sulfide and sulfur dioxide to elementary sulfur. Effluent gases containing vaporous sulfur then leave this vessel 56 through a line 57 and the vapors may be passed directly from line 57 through line 58 into the sulfur-carbon black mixer 18 of Figure 1. In this manner vaporous sulfur is condensed as very finely divided solid sulfur upon the carbon black particles by the time the carbon black particles enter the electroprecipitator 21. In case it is desired to add sulfur to the carbon black by way of molten sulfur in the sulfur pot 19 of Figure 1, then the gases containing vaporous sulfur may be passed from the catalyst vessel 56 through lines 57 and 59 into a separation apparatus 60 in which the sulfur may be recovered by any well known means such as absorption in molten sulfur. Gases free from elementary sulfur then leave the separation vessel 60 through a line 65 for use or disposal as desired. The recovered sulfur may then be removed by way of a conduit 61 and transferred by any means whatever and added to the sulfur pot 19 through the inlet means 30 of Figure 1.

It will usually be preferable to add the sulfur vapors to the carbon black stream at the point indicated in Figure 1. However, in some cases, it may be desirable to add the sulfur vapors to the carbon black at some point following the precipitator, that is, the sulfur vapor may be added to flocculent carbon black in transit or it may be added to the carbon black in the pelleting mill 31. As mentioned hereinbefore the sulfur containing stream from line 58 of Figure 2 may be passed directly into the pellet mill so as to provide a means for heating the pelleting charge in this mill to a temperature of 175° F. or higher and simultaneously depositing finely divided sulfur on the carbon black as it is being pelleted.

One particular advantage of the sulfur containing carbon black of my invention is that by using this product as a source of carbon black and sulfur in the compounding of rubber, the sulfur is added in a very finely divided and colloidal form and sulfur so added promotes thorough and complete mixing of the rubber batch during milling. The sulfur so added to rubber compounds may be effective in preventing or reducing the "bloom" of sulfur which sometimes appears on the surface of some types of rubber products. This bloom may be the result of imperfect mixing of the sulfur during milling. Furthermore the mixing of sulfur with the more alkaline, structure carbon blacks in accordance with my invention yields a product which is effective in increasing the scorch time in the manufacture of rubber.

It will be obvious to those skilled in the art that many variations and alterations in the operation of my process may be practiced. Such variations include variation in the operation of the carbon black furnace 12, the degree of quenching in the primary and secondary carbon black quenching steps, and the method of adding the sulfur to the carbon black. The pelleting operation likewise may be varied somewhat as regards size of the pellet mill, its speed of rotation, the proportion of pellets recycled as well as the temperature maintained when the material in the mill is being pelleted. Similarly, the conditions of operation of the hydrogen sulfide extraction apparatus and of the catalytic conversion step for the production of sulfur may also be varied within limits. Materials of construction of these various apparatus parts may in general be selected from among those commercially available and adapted for use in the particular steps of the operation.

Having disclosed my invention, I claim:

1. A method for the production of an improved carbon black pellet product comprising reacting hydrogen sulfide and sulfur dioxide in the presence of bauxite as a catalyst at a temperature between the limits of 400° F. to 600° F. to form vaporous elementary sulfur, adding to a stream of carbon black in gaseous suspension from 0.05 per cent to 10 per cent by weight of said vaporous elementary sulfur based on the weight of the carbon black, separating an admixture of carbon black and sulfur from the suspending gases and subjecting this admixture of carbon black and sulfur to carbon black dry pelleting conditions at a temperature above 175° F. and below the melting point of sulfur.

2. A method for the production of an improved carbon black pellet product comprising reacting hydrogen sulfide and sulfur dioxide in the presence of bauxite as a catalyst at a temperature between the limits of 400° F. to 600° F. to form vaporous elementary sulfur, adding to flocculent carbon black from 0.05 per cent to 10 per cent by weight of said elementary sulfur at a temperature above 175° F. and below the melting point of sulfur and subjecting this admixture to carbon black dry pelleting conditions at a temperature above 175° F. and below the melting point of sulfur.

3. A method for the production of an improved carbon black pellet product comprising passing a stream of hydrocarbon in the gaseous state into an elongated cylindrical reaction zone, introducing a gas comprising air circumferentially into said zone and mixing the gaseous hydrocarbon with said gas and regulating the amount of gas introduced into said zone for combustion of a portion of the hydrocarbon to generate sufficient temperature within said zone to decompose the unburned portions of the hydrocarbon to carbon black, cooling the carbon black and suspending gases to a temperature above 175° F. but below the melting point of sulfur, introducing a stream of gas comprising hydrogen sulfide and sulfur dioxide at a temperature between 400° F. and 600° F. into a body of bauxite maintained at a temperature between 400° F. and 600° F., withdrawing hot gaseous effluent containing vaporous sulfur from said body of bauxite, admixing said withdrawn hot gaseous effluent containing vaporous sulfur with said cooled products of combustion and decomposition in such proportion that the admixture will contain from 0.05 per cent to 10 per cent by weight of sulfur based on the weight of the carbon black, separating a finely divided material comprising carbon black and sulfur from said admixture and subjecting said separated, finely divided material to carbon black dry pelleting conditions at a temperature above 175° F. and below the melting point of sulfur.

4. A method for the production of an improved carbon black pellet product comprising passing a stream of hydrocarbon in the gaseous state into an elongated cylindrical reaction zone, introducing a gas comprising air circumferentially into said zone and mixing the gaseous hydrocarbon with said gas and regulating the amount of gas introduced into said zone for combustion of a portion of the hydrocarbon to generate sufficient temperature within said zone to decompose the unburned portions of the hydrocarbon to carbon black, cooling the carbon black and suspending gases to a temperature above 175° F. but below the melting point of sulfur, admixing from 0.05 per cent to 10 per cent by weight of vaporous sulfur based on the weight of the carbon black with said cooled products of combustion and decomposition, separating a finely divided material comprising carbon black and sulfur from said admixture, and subjecting said separated finely divided material to carbon black dry pelleting conditions at a temperature above 175° F. and below the melting point of sulfur.

RUSSELL K. SIMMS.

References Cited in the file of this patent

UNITED STATES PATENTS

| Number | Name | Date |
|---|---|---|
| Re. 22,886 | Ayers | June 3, 1947 |
| 1,807,321 | Miller | May 26, 1931 |
| 1,999,573 | Odell | Apr. 30, 1935 |
| 2,316,201 | Wallden et al. | Apr. 13, 1943 |
| 2,317,026 | Brown, Jr., et al. | Apr. 20, 1943 |
| 2,368,828 | Hanson et al. | Feb. 6, 1945 |
| 2,375,798 | Krejci | May 15, 1945 |
| 2,378,055 | Wiegand et al. | June 12, 1945 |
| 2,415,072 | Brown, Jr. | Feb. 4, 1947 |
| 2,427,238 | Swart | Sept. 9, 1947 |